(12) United States Patent
Gam et al.

(10) Patent No.: US 9,835,780 B2
(45) Date of Patent: Dec. 5, 2017

(54) OPTICAL FILM, MANUFACTURING METHOD THEREOF, AND DISPLAY DEVICE

(71) Applicants: SAMSUNG ELECTRONICS CO., LTD., Suwon-si (KR); SAMSUNG SDI CO., LTD., Yongin-si (KR)

(72) Inventors: Sang ah Gam, Seoul (KR); Hye Young Kong, Uijeongbu-si (KR); Hyung Jun Kim, Suwon-si (KR); Hyun-Seok Choi, Anyang-si (KR); Myung Sup Jung, Seongnam-si (KR)

(73) Assignees: SAMSUNG ELECTRONICS CO., LTD., Gyeonggi-do (KR); SAMSUNG SDI CO., LTD, Gyeonggi-do (KR)

( * ) Notice: Subject to any disclaimer, the term of this patent is extended or adjusted under 35 U.S.C. 154(b) by 0 days.

(21) Appl. No.: 14/751,482

(22) Filed: Jun. 26, 2015

(65) Prior Publication Data

US 2015/0378076 A1 Dec. 31, 2015

(30) Foreign Application Priority Data

Jun. 27, 2014 (KR) .................. 10-2014-0080188
Jun. 22, 2015 (KR) .................. 10-2015-0088237

(51) Int. Cl.
*G02F 1/13363* (2006.01)
*G02F 1/1335* (2006.01)
*G02B 5/30* (2006.01)
*B32B 37/00* (2006.01)

(52) U.S. Cl.
CPC .......... *G02B 5/3016* (2013.01); *B32B 37/025* (2013.01); *G02B 5/3033* (2013.01); *G02F 1/13363* (2013.01); *B32B 2309/105* (2013.01); *B32B 2457/202* (2013.01); *G02F 2001/133541* (2013.01); *G02F 2001/133637* (2013.01); *G02F 2001/133638* (2013.01)

(58) Field of Classification Search
CPC ..... G02F 2001/133541; G02F 1/13363; G02F 2001/133638; G02F 2001/133637; G02B 5/3016; B29K 2995/0034; B32B 2551/00
See application file for complete search history.

(56) References Cited

U.S. PATENT DOCUMENTS

| 7,876,403 B2 | 1/2011 | Fukuda et al. |
| 9,442,220 B2 | 9/2016 | Chang et al. |
| 9,448,335 B2 | 9/2016 | Chang et al. |

(Continued)

FOREIGN PATENT DOCUMENTS

| EP | 1933181 | 6/2008 |
| JP | 2007199638 | 8/2007 |

(Continued)

OTHER PUBLICATIONS

European Search Report—European Patent Application No. 151740131 dated Nov. 9, 2015, citing US2013/044286, KR10-1395319 and WO2014/054769.

(Continued)

*Primary Examiner* — Jia Pan
(74) *Attorney, Agent, or Firm* — Cantor Colburn LLP

(57) ABSTRACT

An optical film includes a polarization film including a polymer resin and a dichroic dye, and a phase delay layer disposed on the polarization film and including a liquid crystal.

20 Claims, 6 Drawing Sheets

(56) References Cited

U.S. PATENT DOCUMENTS

| | | | | |
|---|---|---|---|---|
| 2005/0243252 A1* | 11/2005 | Matsuoka | ............ | G02B 5/3083 349/117 |
| 2007/0056682 A1* | 3/2007 | Yamada | ............ | G02B 5/3083 156/249 |
| 2009/0135343 A1* | 5/2009 | Kitamura | ............ | G02B 5/3033 349/96 |
| 2009/0178756 A1* | 7/2009 | Matsuoka | ............ | G02B 5/3083 156/99 |
| 2012/0003400 A1* | 1/2012 | Nishimura | ............ | B32B 27/08 428/1.1 |
| 2012/0050652 A1* | 3/2012 | Chang | ............ | B29C 43/003 349/96 |
| 2012/0327342 A1 | 12/2012 | Kim et al. | | |
| 2013/0044286 A1* | 2/2013 | Yoon | ............ | G02F 1/13363 349/194 |
| 2014/0247487 A1* | 9/2014 | Jeon | ............ | G02B 5/3083 359/489.07 |
| 2014/0307317 A1* | 10/2014 | Jeon | ............ | G02B 5/3025 359/489.07 |
| 2015/0212246 A1* | 7/2015 | Yoshida | ............ | G02B 5/3016 349/194 |
| 2015/0293286 A1* | 10/2015 | Jeon | ............ | G02B 5/3016 359/489.07 |
| 2016/0011352 A1* | 1/2016 | Saitoh | ............ | G02B 5/3083 257/98 |

FOREIGN PATENT DOCUMENTS

| | | |
|---|---|---|
| KR | 1020060110078 | 10/2006 |
| KR | 1020080064803 | 7/2008 |
| KR | 1020120021184 | 3/2012 |
| KR | 1020130003070 | 1/2013 |
| KR | 101395319 | 5/2014 |
| WO | 2014054769 | 4/2014 |

OTHER PUBLICATIONS

Third Party Observation—EP Application No. 15174013.1 dated Aug. 9, 2017, citing references listed within.

* cited by examiner

OPTICAL FILM, MANUFACTURING METHOD THEREOF, AND DISPLAY DEVICE

CROSS-REFERENCE TO RELATED APPLICATION

This application claims priorities to Korean Patent Application Nos. 10-2014-0080188 and 10-2015-0088237 filed on Jun. 27, 2014 and Jun. 22, 2015, and all the benefits accruing therefrom under 35 U.S.C. §119, the content of which in its entirety is herein incorporated by reference.

BACKGROUND

1. Field

The disclosure relates to an optical film, a manufacturing method thereof, and a display device including the optical film.

2. Description of the Related Art

Commonly used flat panel displays may be classified into a light-emitting display device that emits light by itself and a non-emissive display device that includes a separate light source, and an optical or compensation film such as a retardation film is typically employed for improving the image quality thereof.

In the case of the light emitting display device, for example, an organic light emitting display, the visibility and the contrast ratio may be deteriorated by reflection of external light caused by a metal such as an electrode. In the light emitting display device, the linear polarized light is shifted into circularly polarized light using a polarizing plate and a retardation film to reduce such reflection of external light, such that reflection of the external light by the organic light emitting display and leakage thereof to the outside may be effectively prevented.

In the liquid crystal display ("LCD"), which is the non-emissive display device, the linear polarized light is changed into the circularly polarized light to improve the image quality by reducing the external light reflection, based on the type of device, such as transparent type LCD, transflective type LCD, reflective type LCD, and so on.

However, a conventional optical film used in a flat panel display typically has weak optical durability and has an effect on display quality, and has a thick thickness.

SUMMARY

An exemplary embodiment of the invention provides an optical film having improved optical durability and optical characteristics and a thin thickness.

Another exemplary embodiment provides a method of manufacturing the optical film.

Yet another exemplary embodiment provides a display device including the optical film.

According to an exemplary embodiment, an optical film includes a polarization film including a polymer resin and a dichroic dye, and a phase delay layer disposed on the polarization film and including a liquid crystal.

In an exemplary embodiment, in-plane phase retardation ($R_{e0}$) of the phase delay layer for 450 nanometers (nm), 550 nm and 650 nm wavelengths may satisfy the following inequality: $R_{e0}$ (450 nm)≤$R_{e0}$ (550 nm)<$R_{e0}$ (650 nm) or $R_{e0}$ (450 nm)<$R_{e0}$ (550 nm)≤$R_{e0}$ (650 nm).

In an exemplary embodiment, the phase delay layer may have short wavelength dispersion in a range from about 0.70 to about 0.99, and the phase delay layer may have long wavelength dispersion in a range from about 1.01 to about 1.20.

In an exemplary embodiment, in-plane phase retardation ($R_{e0}$) of the phase delay layer for 550 nm wavelength may be in a range from about 120 nm to about 160 nm.

In an embodiment, the phase delay layer may include a first phase delay layer and a second phase delay layer, the first and second phase delay layers may have different retardation from each other, and each of the first and second phase delay layers may include liquid crystal.

In an exemplary embodiment, the first phase delay layer may be a λ/2 phase delay layer, and the second phase delay layer may be a λ/4 phase delay layer.

In an exemplary embodiment, the first phase delay layer and the second phase delay layer may each have a refractive index satisfying the following relationship: $n_x > n_y = n_z$ or $n_x < n_y = n_z$, where $n_x$ denotes a refractive index of the first or second phase delay layer at a slow axis thereof, $n_y$ denotes a refractive index of the first or second phase delay layer at a fast axis thereof, and $n_z$ denotes a refractive index of the first or second phase delay layer in a direction perpendicular to the slow and fast axes thereof.

In an exemplary embodiment, in-plane phase retardation ($R_{e1}$) of the first phase delay layer for 450 nm, 550 nm and 650 nm wavelengths may satisfy the following inequality: $R_{e1}$ (450 nm)>$R_{e1}$ (550 nm)>$R_{e1}$ (650 nm), in-plane phase retardation ($R_{e2}$) of the second phase delay layer for 450 nm, 550 nm and 650 nm wavelengths may satisfy the following inequality: $R_{e2}$ (450 nm)>$R_{e2}$ (550 nm)>$R_{e2}$ (650 nm), and entire in-plane phase retardation ($R_{e0}$) of the first phase delay layer and the second phase delay layer for 450 nm, 550 nm and 650 nm wavelengths may satisfy the following inequality: $R_{e0}$ (450 nm)≤$R_{e0}$ (550 nm)<$R_{e0}$ (650 nm) or $R_{e0}$ (450 nm)<$R_{e0}$ (550 nm)≤$R_{e0}$ (650 nm).

In an exemplary embodiment, the first phase delay layer and the second phase delay layer may each have short wavelength dispersion in a range from about 1.1 to about 1.2, and the first phase delay layer and the second phase delay layer may have entire short wavelength dispersion in a range from about 0.70 to about 0.99.

In an exemplary embodiment, the first phase delay layer and the second phase delay layer may each have long wavelength dispersion in a range from about 0.9 to about 1.0, and the first phase delay layer and the second phase delay layer may have entire long wavelength dispersion in a range from about 1.01 to about 1.20.

In an exemplary embodiment, in-plane phase retardation ($R_{e1}$) of the first phase delay layer for 550 nm wavelength may be in a range from about 230 nm to about 270 nm, in-plane phase retardation ($R_{e2}$) of the second phase delay layer for 550 nm wavelength may be in a range from about 100 nm to about 140 nm, and entire in-plane phase retardation ($R_{e0}$) of the first phase delay layer and the second phase delay layer for 550 nm wavelength may be in a range from about 120 nm to about 160 nm.

In an embodiment, an angle between a slow axis of the first phase delay layer and a slow axis of the second phase delay layer may be in a range from about 50 degrees to about 70 degrees.

In an exemplary embodiment, the optical film may further include an adhesion layer disposed between the first phase delay layer and the second phase delay layer.

In an exemplary embodiment, the phase delay layer may have a thickness less than or equal to about 10 micrometers (μm).

In an exemplary embodiment, the optical film may further include an adhesion layer disposed between the polarization film and the phase delay layer.

In an exemplary embodiment, the polymer resin may include a polyolefin, a polyamide, a polyester, a polyacryl, polystyrene, a copolymer thereof, or a combination thereof.

In an exemplary embodiment, the polymer resin may include polyethylene (PE), polypropylene (PP), polyethylene terephthalate (PET), polyethylene terephthalate glycol (PETG), polyethylene naphthalate (PEN), nylon, a copolymer thereof, or a combination thereof.

In an exemplary embodiment, the polarization film may have a thickness less than or equal to about 100 μm.

In an exemplary embodiment, the polarization film may include a melt blend of the polymer resin and the dichroic dye.

In an exemplary embodiment, a transparent substrate may not be present between the polarization film and the phase delay layer.

According to another exemplary embodiment, a display device including an optical film described above.

According to another exemplary embodiment, a method of manufacturing an optical film includes melt-blending a polymer resin and a dichroic dye to prepare a polarization film, preparing a phase delay layer including liquid crystal on a substrate, and providing the phase delay layer on the polarization film.

In an exemplary embodiment, the providing the phase delay layer on the polarization film may include removing the phase delay layer from the substrate and transferring it to a surface of the polarization film.

In an exemplary embodiment, the manufacturing method may further include providing an adhesion layer on a surface of the polarization film.

In an exemplary embodiment, the preparing the phase delay layer may include stacking a λ/2 phase delay layer and a λ/4 phase delay layer on the substrate.

BRIEF DESCRIPTION OF THE DRAWINGS

The above and other features of the invention will become more apparent by describing in further detail exemplary embodiments thereof with reference to the accompanying drawings, in which.

DETAILED DESCRIPTION

Figure 1:
FIG. 1 is a schematic cross-sectional view of an exemplary embodiment of an optical film according to the invention.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, an exemplary embodiment of an optical film according to the invention will be described referring to FIG. 1.

Figure 2:
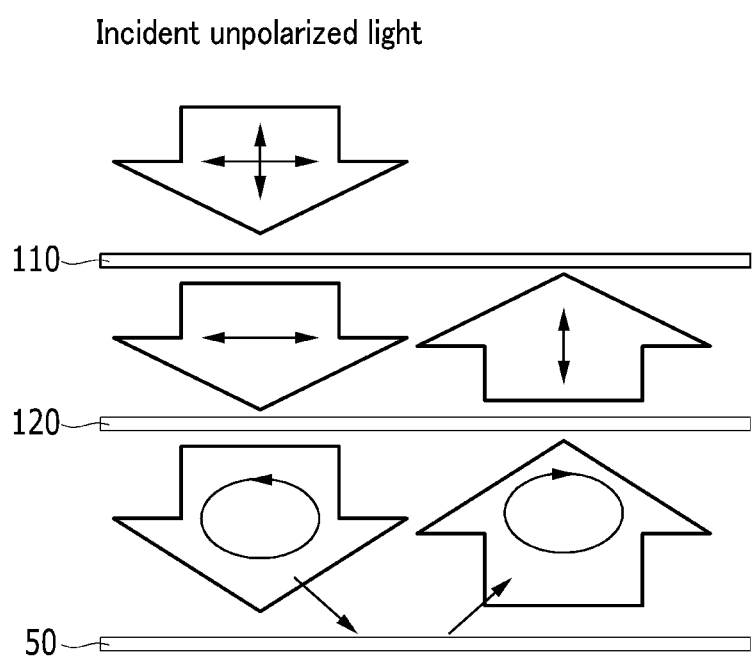
FIG. 2 is a schematic view showing the external light anti-reflection principle of an exemplary embodiment of an optical film according to the invention.
Figure 3:
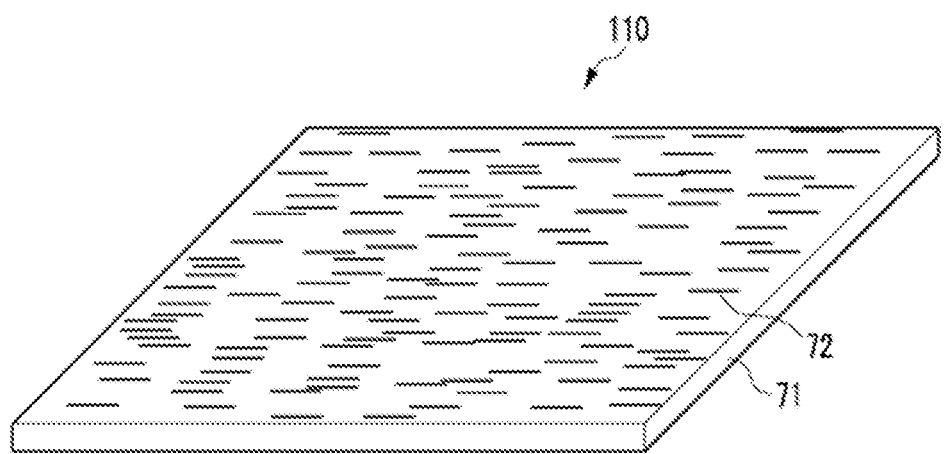
FIG. 3 is a schematic view of an exemplary embodiment of a polarization film according to the invention.

FIG. 1 is a schematic cross-sectional view of an exemplary embodiment of an optical film according to the invention, FIG. 2 is a schematic view showing the external light anti-reflection principle of an exemplary embodiment of an optical film according to the invention, and FIG. 3 is a schematic view of an exemplary embodiment of a polarization film according to the invention.

Referring to FIG. 1, an exemplary embodiment of an optical film 100 according to the invention includes a polarization film 110 and a phase delay layer 120 disposed on the polarization film 110. In one exemplary embodiment, for example, the phase delay layer 120 may be disposed or stacked on a surface of the polarization film 110. The phase delay layer 120 may be, for example, a λ/4 plate, and the phase delay layer 120 may circularly polarize light passing through the polarization film 110 and thus cause retardation and have an influence on absorption and reflection of the light.

Such an embodiment of the optical film 100 may be disposed on a surface or both surfaces of a display device. In one exemplary embodiment, for example, the optical film 100 may be disposed on a screen side of the display device, and thus may effectively prevent reflection of light flowing in from the outside (hereinafter referred to as "reflection of external light"). Therefore, the optical film 100 may effectively prevent visibility deterioration due to the reflection of external light.

FIG. 2 is a schematic view showing the external light anti-reflection principle of an exemplary embodiment of an optical film according to the invention.

Referring to FIG. 2, when incident unpolarized light from the outside is passed through the polarization film 110, and the polarized light is shifted into circularly polarized light by passing through the phase delay layer 120, only a first polarized component (e.g., a horizontal component), which is one of two polarized components perpendicular to each other, is transmitted. When the circularly polarized light is reflected in a display panel 50 including a substrate, an electrode and so on, the circularly polarized light changes the circular polarization direction, and the circularly polarized light passes through the phase delay layer 120 again, such that only a second polarized component (e.g., a perpendicular component), which is the other of the two polarized components, may be transmitted. As the second polarized perpendicular component is not passed through the polarization film 110, and light does not exit to the outside, thereby effectively preventing the external light reflection.

Referring to FIG. 3, the polarization film 110 has a self-integrated structure including a polymer resin 71 and a dichroic dye 72, e.g., made of a melt blend of the polymer resin 71 and the dichroic dye 72.

In an exemplary embodiment, the polymer resin 71 may include, for example, a hydrophobic polymer resin, for example a polyolefin resin such as polyethylene ("PE"), polypropylene ("PP"), and a copolymer thereof; a polyamide resin such as nylon and an aromatic polyamide; a polyester resin such as polyethylene terephthalate ("PET"), polyethylene terephthalate glycol ("PETG"), and polyethylene naphthalate ("PEN"); a polyacrylic resin such as polymethyl(meth)acrylate; a polystyrene resin such as polystyrene ("PS") and an acrylonitrile-styrene copolymer; a polycarbonate resin; a vinyl chloride-based resin; a polyimide resin; a sulfone resin; a polyethersulfone resin; a polyether-etherketone resin; a polyphenylene sulfide resin; a vinyl alcohol resin; a vinylidene chloride resin; a vinyl butyral resin; an allylate resin; a polyoxymethylene resin; an epoxy resin; a copolymer thereof; or a combination thereof.

In one exemplary embodiment, the polymer resin 71 may include, for example, a polyolefin resin, a polyamide resin, a polyester resin, a polyacrylic resin, a polystyrene resin, a copolymer thereof, or a combination thereof, and for another example, PE, PP, PET, PETG, PEN, nylon, a copolymer thereof, or a combination thereof.

In one exemplary embodiment, the polymer resin 71 may include, for example, at least two of PE, PP, and a copolymer of polyethylene and polypropylene ("PE-PP"). In an alternative exemplary embodiment, the polymer resin 71 may include a mixture of PP and a PE-PP.

The PP may have, for example, a melt flow index ("MFI") in a range from about 0.1 gram per 10 minutes (g/10 min) to about 5 g/10 min. Herein, the MFI is defined as the amount of a polymer in a melt state flowing per 10 minutes, and relates to viscosity of the polymer in a melted state. Accordingly, as the MFI is lower, the polymer has higher viscosity, while as the MFI is higher, the polymer has lower viscosity. When the PP has a MFI within the range, properties of a final product and workability may be effectively improved. In one exemplary embodiment, for example, the polypropylene may have a MFI in a range from about 0.5 g/10 min to about 5 g/10 min.

In an exemplary embodiment, the PE-PP may include an ethylene group in an amount in a range from about 1 weight percent (wt %) to about 50 wt % based on the total amount of the copolymer. When the PE-PP includes the ethylene group in an amount within the range, phase separation of the polypropylene and the PE-PP may be effectively prevented or suppressed. In such an embodiment, the PE-PP may improve an elongation rate during elongation as well as have high light transmittance and alignment, thereby improving polarization characteristics. In one exemplary embodiment, for example, the PE-PP may include an ethylene group in an amount in a range from about 1 wt % to about 25 wt % based on the total amount of the copolymer.

The PE-PP may have a MFI in a range from about 5 g/10 min to about 15 g/10 min. When the PE-PP has a MFI within the range, properties of a final product as well as workability may be effectively improved. In one exemplary embodiment, for example, the PE-PP may have a MFI in a range from about 10 g/10 min to about 15 g/10 min.

The polymer resin 71 may include the PP and the PE-PP in a weight ratio in a range from about 1:9 to about 9:1. When the PP and the PE-PP of the polymer resin 71 is in the ratio, the PP may be effectively prevented from crystallizing and may have high mechanical strength, thus effectively improving the haze characteristics. In one exemplary embodiment, for example, the polymer resin 71 may include the PP and the PE-PP in a weight ratio in a range from about 4:6 to about 6:4, or in a range from about 5:5.

The polymer resin 71 may have a MFI in a range from about 1 g/10 min to about 15 g/10 min. When the polymer resin 71 has a MFI within the range, the polymer resin may not only secure excellent light transmittance since crystals are not excessively formed in the resin, but may also have appropriate viscosity for manufacturing a film, thereby improving workability. In one exemplary embodiment, for example, the polymer resin 71 may have a MFI in a range from about 5 g/10 min to about 15 g/10 min.

The polymer resin 71 may have haze less than or equal to about 5%. When the polymer resin 71 has haze within the range, transmittance may be increased, and thus high optical properties may be secured. In one exemplary embodiment, for example, the polymer resin 71 may have haze less than or equal to about 2%, or in a range about 0.5% to about 2%.

The polymer resin 71 may have crystallinity less than or equal to about 50%. When the polymer resin 71 has crystallinity within the range, the polymer resin may have lower haze and accomplish excellent optical properties. In one exemplary embodiment, for example, the polymer resin 71 may have crystallinity in a range from about 30% to about 50%.

The polymer resin 71 may have transmittance greater than or equal to about 85% in a wavelength region of about 400 nanometers (nm) to about 780 nm. The polymer resin 71 may be elongated in a uniaxial direction. The direction may be the length direction of the dichroic dye 72.

In an exemplary embodiment, the dichroic dye 72 is dispersed into the polymer resin 71 and aligned in the elongation direction of the polymer resin 71. The dichroic dye 72 transmits a polarization component of two polarization components perpendicular to each other in a predetermined wavelength region.

The dichroic dye 72 may be included in an amount in a range from about 0.01 parts by weight to about 5 parts by weight, based on 100 parts by weight of the polymer resin 71. When the dichroic dye 72 is within the range, sufficient polarization characteristics may be obtained without deteriorating transmittance of a polarization film. In one exemplary embodiment, for example, the dichroic dye 72 may be included in an amount of about 0.05 part by weight to about 1 part by weight, based on 100 parts by weight of the polymer resin 71.

The polarization film 110 may have a dichroic ratio in a range from about 2 to about 14 at a maximum absorption wavelength ($\lambda_{max}$) in a visible ray region. In one exemplary embodiment, for example, the dichroic ratio may be in a range from about 3 to about 10. Herein, the dichroic ratio is a value obtained by dividing linear polarization absorption in a direction perpendicular to the axis of the polymer by polarization absorption in a direction parallel to the polymer, and the dichroic ratio of a polarization film may be obtained by the following Equation 1.

$$DR = \text{Log}(1/T_\perp)/\text{Log}(1/T_\parallel) \qquad \text{Equation 1}$$

In the Equation 1, DR denotes the dichroic ratio of the polarization film, $T_\parallel$ denotes light transmittance of light entering parallel to the transmissive axis of the polarization film, and $T_\perp$ denotes light transmittance of light entering perpendicular to the transmissive axis of the polarization film.

The dichroic ratio refers to a degree that the dichroic dye 72 is aligned in one direction in the polarization film 110. The polarization film 110 has a dichroic ratio within the range in a visible ray wavelength region, by allowing the dichroic dye 72 to be aligned along the alignment of a polymer chain, and thus the polarizing characteristic thereof may be improved.

The polarization film 110 may have polarizing efficiency greater than or equal to about 80%, e.g., in a range from about 83% to about 99.9%. Herein, the polarizing efficiency of a polarization film may be obtained by the following Equation 2.

$$PE(\%) = [(T_\parallel - T_\perp)/(T_\parallel + T_\perp)]^{1/2} \times 100 \qquad \text{Equation 2}$$

In the Equation 2, PE denotes the polarizing efficiency, $T_\parallel$ denotes light transmittance of the polarization film regarding light parallel to the transmissive axis of the polarization film, and $T_\perp$ denotes light transmittance of the polarization film regarding light perpendicular to the transmissive axis of the polarization film.

The polarizing film 110 may have a relatively thin thickness less than or equal to about 100 micrometers (μm), for example, in a range from about 30 μm to about 95 μm. When the polarizing film 70 has a thickness with the range, the polarizing film 70 may be thinner than a polarizing plate including a protective layer such as triacetyl cellulose ("TAC"), such that a display device including the polarizing film 70 may have a reduced thickness.

The phase delay layer 120 may be disposed on the polarization film 110, and may include an anisotropic liquid crystal layer including liquid crystal.

The liquid crystal may have a rigid-rod shape that is aligned in a same direction or a flat-disc shape, and may be, for example a monomer, an oligomer, or a polymer. The liquid crystal may have, for example, positive or negative birefringence. The birefringence (Δn) is a difference acquired by subtracting the refractive index ($n_o$) of light propagating perpendicular to an optical axis from the refractive index ($n_e$) of light propagating parallel to the optical axis. The liquid crystal may be aligned in a predetermined direction along the optical axis.

The liquid crystal may be a reactive mesogen liquid crystal, and may have, for example, a reactive cross-linking group. The reactive mesogen liquid crystal may include, for example, a rod-shaped aromatic derivative having at least one reactive cross-linking group, propylene glycol 1-methyl, propylene glycol 2-acetate, a compound represented by P1-A1-(Z1-A2)n-P2, or a combination thereof, where P1 and P2 independently include acrylate, methacrylate, vinyl, vinyloxy, epoxy or a combination thereof, A1 and A2 independently include a 1,4-phenylene, naphthalene-2,6-diyl group or a combination thereof, Z1 includes a single bond, —COO—, —OCO— or a combination thereof, and n is 0, 1 or 2, but is not limited thereto.

The phase delay layer 120 may have inverse wavelength dispersion phase delay. Herein, the inverse wavelength dispersion phase delay means that retardation of light having a long wavelength is higher than retardation of light having a short wavelength.

The phase delay may be represented by in-plane phase retardation ($R_{e0}$), and in-plane phase retardation ($R_{e0}$) may be represented by the following equation: $R_{e0} = (n_{x0} - n_{y0}) \times d_0$. Herein, $n_{x0}$ denotes a refractive index in a direction having a highest refractive index in a plane of the phase delay layer 120 (hereinafter referred to as "slow axis"), $n_{y0}$ denotes a refractive index in a direction having a lowest refractive index in a plane of the phase delay layer 120 (hereinafter referred to as "fast axis"), and $d_0$ denotes a thickness of the phase delay layer 120.

The in-plane phase retardation may be provided within a predetermined range by changing thicknesses or refractive indices at the slow or fast axis of the phase delay layer 120.

According to one exemplary embodiment, the in-plane phase retardation ($R_{e0}$) of the phase delay layer 120 for 550 nm wavelength (hereinafter referred to as "reference wavelength") may be in a range from about 120 nm to about 160 nm.

In the phase delay layer 120, the retardation of light having a long wavelength is higher than the retardation of light having a short wavelength as described above. In one exemplary embodiment, for example, the in-plane phase retardation ($R_{e0}$) of the phase delay layer 120 for 450 nm, 550 nm, and 650 nm wavelengths may satisfy the following inequality: $R_{e0}$ (450 nm)≤$R_{e0}$ (550 nm)<$R_{e0}$ (650 nm) or $R_{e0}$ (450 nm)<$R_{e0}$ (550 nm)≤$R_{e0}$ (650 nm). Herein, $R_{e0}$ (450 nm) denotes the in-plane phase retardation for 450 nm wavelength, $R_{e0}$ (550 nm) denotes in-plane phase retardation for 550 nm wavelength, and $R_{e0}$ (650 nm) denotes in-plane phase retardation for 650 nm wavelength.

The changing of the retardation of the short wavelength for the reference wavelength may be represented by short wavelength dispersion, that is, $R_{e0}$ (450 nm)/$R_{e0}$ (550 nm). In one exemplary embodiment, for example, the short wavelength dispersion of the phase delay layer 120 may be in a range from about 0.70 to about 0.99.

The changing of the retardation of the long wavelength for the reference wavelength may be represented by long wavelength dispersion, that is, $R_{e0}$ (650 nm)/$R_{e0}$ (550 nm). In one exemplary embodiment, for example, the long wavelength dispersion of the phase delay layer 120 may be in a range from about 1.01 to about 1.20.

On the other hand, the retardation includes thickness direction retardation ($R_{th}$) besides the in-plane retardation ($R_{e0}$). The thickness direction retardation ($R_{th0}$) is retardation generated in a thickness direction of the phase delay layer 120, and the thickness direction retardation ($R_{th0}$) of the phase delay layer 120 may be represented by the following equation: $R_{th0} = \{[(n_{x0}+n_{y0})/2] - n_{z0}\} \times d_0$. Herein, $n_{x0}$ denotes a refractive index at a slow axis of the phase delay layer 120, $n_{y0}$ denotes a refractive index at a fast axis of the phase delay layer 120, and $n_{z0}$ denotes a refractive index of the phase delay layer 120 in a direction perpendicular to the fast and slow axes thereof.

In one exemplary embodiment, for example, thickness direction retardation ($R_{th0}$) of the phase delay layer 120 for a reference wavelength may be in a range from about −250 nm to about 250 nm.

The phase delay layer 120 may have a thickness less than or equal to about 10 μm.

The phase delay layer 120 may be disposed on the polarization film 110, and the phase delay layer 120 and the polarization film 110 may contact each other directly or an adhesion layer (not shown) may be interposed therebetween. Herein, the adhesion layer may include, for example, a pressure sensitive adhesive.

In one exemplary embodiment, for example, the optical film 100 may be prepared by melt-blending a polymer resin and a dichroic dye to prepare a polarization film 110, preparing a phase delay layer 120 including liquid crystal on a substrate, and forming the phase delay layer 120 on a surface of the polarization film 110.

In an exemplary embodiment, the polarization film 110 is prepared by melt-blending a composition including the polymer resin 71 and the dichroic dye 72, putting the melt-blend into a mold and pressing it into a sheet, and elongating the sheet in a uniaxial direction.

In an exemplary embodiment, the polymer resin 71 and the dichroic dye 72 may be independently in a solid form such as a powder, and may be melt-blended at a temperature above the melting point ($T_m$) of the polymer resin 71 and elongated to prepare the polarization film 110.

The melt-blending may be performed at a temperature less than or equal to about 300° C., or in a range from about 130° C. to about 300° C. The sheet may be formed by putting the melt blend in the mold, and pressing the melt blend with a high pressure or discharging the melt blend in a chill roll through a T-die. The elongation in a uniaxial direction may be performed at a temperature in a range from about 25° C. to about 200° C. at an elongation rate in a range from about 400% to about 1000%. The elongation rate refers to a length ratio of after the elongation to before the elongation of the sheet, and represents the elongation extent of the sheet after uniaxial elongation.

The phase delay layer 120 may be prepared by coating a liquid crystal solution on a substrate and curing the coated liquid crystal solution with photo-radiation. The substrate may be, for example, a TAC film, but is not limited thereto. The phase delay layer 120 may be prepared by removing the phase delay layer 120 from the substrate and transferring the phase delay layer 120 on a surface of the polarization film 110. Herein, an adhesion layer may be provided, e.g., formed, on a surface of the polarization film 110 or on a surface of the phase delay layer 120. However, the transferring method is not limited to the above method, and may be, for example, roll-to-roll, spin coating, and the like.

The optical film 100 may further include a correction layer (not shown) disposed on the phase delay layer 120. The correction layer may be, for example, a color shift resistant layer, but is not limited thereto.

The optical film 100 may further include a light blocking layer (not shown) extending along an edge thereof. The light blocking layer may have a strip shape extending along a circumference of the optical film 100, and for example, may be disposed between the polarization film 110 and the phase delay layer 120. The light blocking layer may include an opaque material, for example, a black material. In one exemplary embodiment, for example, the light blocking layer may include or be made of a black ink.

Hereinafter, an alternative exemplary embodiment of an optical film according to the invention will be described.

Figure 4:
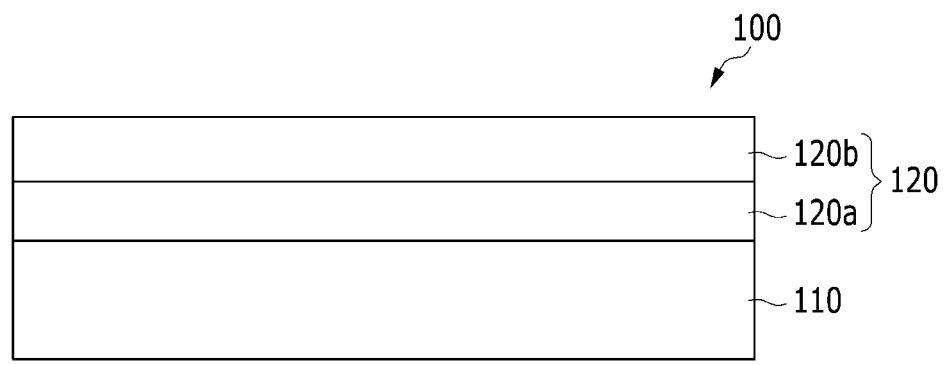
FIG. 4 is a schematic view of an alternative exemplary embodiment of an optical film according to the invention.

FIG. 4 is a schematic view of an alternative exemplary embodiment of an optical film according to the invention.

Referring to FIG. 4, the optical film 100 includes a polarization film 110 and a phase delay layer 120 disposed on the polarization film 110.

In an exemplary embodiment, as shown in FIG. 4, the phase delay layer 120 may include a plurality of phase delay layers, e.g., a first phase delay layer 120a and a second phase delay layer 120b having different retardation from each other.

In such an embodiment, one of the first phase delay layer 120a and the second phase delay layer 120b may be a λ/2 phase delay layer 120, and the other may be a λ/4 phase delay layer 120. In one exemplary embodiment, for example, the first phase delay layer 120a may be a λ/2 phase delay layer 120 and the second phase delay layer 120b may be a λ/4 phase delay layer 120.

The first phase delay layer 120a and the second phase delay layer 120b may each be an anisotropic liquid crystal layer including liquid crystal, and the first phase delay layer 120a and the second phase delay layer 120b may independently have positive or negative birefringence.

The first phase delay layer 120a and second phase delay layer 120b may each have forward wavelength dispersion phase delay, and a combination of the first phase delay layer 120a and the second phase delay layer 120b may have an inverse wavelength dispersion phase delay. The forward wavelength dispersion phase delay has higher retardation of light having a short wavelength than retardation of light having a long wavelength, and the reverse wavelength dispersion phase delay has higher retardation of light having a long wavelength than retardation of light having a short wavelength.

The phase delay may be represented by in-plane phase retardation, in-plane phase retardation ($R_{e1}$) of the first phase delay layer 120a may be represented by the following equation: $R_{e1}=(n_{x1}-n_{y1})\times d_1$, in-plane phase retardation ($R_{e2}$) of the second phase delay layer 120b may be represented by the following equation: $R_{e2}=(n_{x2}-n_{y2})\times d_2$, and the entire in-plane phase retardation ($R_{e0}$) of the phase delay layer 120 may be represented by the following equation: $R_{e0}=(n_{x0}-n_{y0})\times d_0$. Herein, $n_{x1}$ denotes a refractive index at a slow axis of the first phase delay layer 120a, $n_{y1}$ denotes a refractive index at a fast axis of the first phase delay layer 120a, $d_1$ denotes a thickness of the first phase delay layer 120a, $n_{x2}$ denotes a refractive index at a slow axis of the second phase delay layer 120b, $n_{y2}$ denotes a refractive index at a fast axis of the second phase delay layer 120b, $d_2$ denotes a thickness of the second phase delay layer 120b, $n_{x0}$ denotes a refractive index at a slow axis of the phase delay layer 120, $n_{y0}$ denotes a refractive index at a fast axis of the phase delay layer 120, and $d_0$ denotes a thickness of the phase delay layer 120.

Accordingly, the in-plane retardation ($R_{e1}$ and $R_{e2}$) may be provided within a predetermined range by changing refractive indices at the slow or fast axis or thicknesses of the first phase delay layer 120a and the second phase delay layer 120b.

According to one exemplary embodiment, in-plane phase retardation ($R_{e1}$) for a reference wavelength of the first phase delay layer 120a may be in a range from about 230 nm to about 270 nm, in-plane phase retardation ($R_{e2}$) for a reference wavelength of the second phase delay layer 120b may be in a range from about 100 nm to about 140 nm, entire in-plane phase retardation of the first phase delay layer 120a and the second phase delay layer 120b, that is, in-plane phase retardation ($R_{e0}$) of the phase delay layer 120, for incident light having a reference wavelength, may be the difference between the in-plane retardation ($R_{e1}$) of the first phase delay layer 120a and the in-plane retardation ($R_{e2}$) of the second phase delay layer 120b. In one exemplary embodiment, for example, the in-plane phase retardation ($R_{e0}$) of the phase delay layer 120 for a reference wavelength may be in a range from about 120 nm to about 160 nm.

In the first phase delay layer 120a and the second phase delay layer 120b, the retardation of light having a short wavelength may be higher than the retardation of light having a long wavelength as described above. In one exemplary embodiment, for example, the in-plane retardation ($R_{e1}$) of the first phase delay layer 120a for the wavelengths of 450 nm, 550 nm and 650 nm may satisfy the following inequality: $R_{e1}$ (450 nm)$\geq R_{e1}$ (550 nm)$>R_{e1}$ (650 nm) or $R_{e1}$ (450 nm)$>R_{e1}$ (550 nm)$\geq R_{e1}$ (650 nm), and the in-plane retardation ($R_{e2}$) of the second phase delay layer 120b for the wavelengths of 450 nm, 550 nm and 650 nm may satisfy the following inequality: $R_{e2}$ (450 nm)$>R_{e2}$ (550 nm)$>R_{e2}$ (650 nm).

The combination of the first phase delay layer 120a and the second phase delay layer 120b may have higher retardation of light having a long wavelength than the retardation of light having a short wavelength as described above. In one exemplary embodiment, for example, the in-plane phase retardation ($R_{e0}$) of the first phase delay layer 120a and the second phase delay layer 120b at 450 nm, 550 nm and 650 nm wavelengths may satisfy the following inequality: $R_{e0}$ (450 nm)$\leq R_{e0}$ (550 nm)$<R_{e0}$ (650 nm) or $R_{e0}$ (450 nm)$<R_{e0}$ (550 nm)$\leq R_{e0}$ (650 nm).

The changing of the retardation of the short wavelength for the reference wavelength may be represented by short wavelength dispersion, the short wavelength dispersion of the first phase delay layer 120a may be represented by $R_{e1}$ (450 nm)/$R_{e1}$ (550 nm), and the short wavelength dispersion of the second phase delay layer 120b may be represented by $R_{e2}$ (450 nm)/$R_{e2}$ (550 nm). In one exemplary embodiment, for example, the short wavelength dispersion of the first phase delay layer 120a and the second phase delay layer 120b may independently be in a range from about 1.1 to about 1.2, and the entire short wavelength dispersion of the first phase delay layer 120a and the second phase delay layer 120b may be in a range from about 0.70 to about 0.99.

The changing of the retardation of the long wavelength for the reference wavelength may be represented by long wavelength dispersion, the long wavelength dispersion of the first phase delay layer 120a may be represented by $R_{e1}$ (650 nm)/$R_{e1}$ (550 nm), and the long wavelength dispersion of the second phase delay layer 120b may be represented by $R_{e2}$ (650 nm)/$R_{e2}$ (550 nm). In one exemplary embodiment, for example, the long wavelength dispersion of the first phase delay layer 120a and the second phase delay layer 120b may independently be in a range from about 0.9 to about 1.0, and the entire long wavelength dispersion of the first phase delay layer 120a and the second phase delay layer 120b may be in a range from about 1.01 to about 1.20.

On the other hand, the thickness direction retardation ($R_{th1}$) of the first phase delay layer 120a may be represented by the following equation: $R_{th1}=\{[(n_{x1}+n_{y1})/2]-n_{z1}\}\times d_1$, the thickness direction retardation ($R_{th2}$) of the second phase delay layer 120b may be represented by the following equation: $R_{th2}=\{[(n_{x2}+n_{y2})/2]-n_{z2}\}\times d_2$, and the thickness direction retardation ($R_{th0}$) of the combined first phase delay layer 120a and the second phase delay layer 120b may be represented by the following equation: $R_{th0}=\{[(n_{x0}+n_{y0})/2]-n_{z0}\}\times d_0$. Herein, $n_{x1}$ denotes a refractive index at a slow axis of the first phase delay layer 120a, $n_{y1}$ denotes a refractive index at a fast axis of the first phase delay layer 120a, $n_{z1}$ denotes a refractive index of the first phase delay layer 120a in a direction perpendicular to the slow and fast axes thereof, $n_{x2}$ denotes a refractive index at a slow axis of the second phase delay layer 120b, $n_{y2}$ denotes a refractive index at a fast axis of the second phase delay layer 120b, $n_{z2}$ denotes a refractive index of the second phase delay layer 120b in a direction perpendicular to the fast and slow axes thereof, $n_{x0}$ denotes a refractive index at a slow axis of the phase delay layer 120, $n_{y0}$ denotes a refractive index at a fast axis of the phase delay layer 120, and $n_{z0}$ denotes a refractive index of the phase delay layer 120 in a direction perpendicular to the fast and slow axes thereof.

The thickness direction retardation ($R_{th0}$) of the phase delay layer 120 may be the sum of the thickness direction retardation ($R_{th1}$) of the first phase delay layer 120a and the thickness direction retardation ($R_{th2}$) of the second phase delay layer 120b.

An angle between a slow axis of the first phase delay layer 120a and a slow axis of the second phase delay layer 120b may be in a range from about 50 to about 70 degrees. In one exemplary embodiment, for example, the angle may be, for example, in a range from about 55 to about 65 degrees, in a range from about 52.5 to about 62.5 degrees, or in a range from about 60 degrees. In one exemplary embodiment, for example, the slow axis of the first phase delay layer 120a may be about 15 degrees, the slow axis of the second phase delay layer 120b may be about 75 degrees, and an angle therebetween may be about 60 degrees.

In an exemplary embodiment, the first phase delay layer 120a and the second phase delay layer 120b may independently have respective refractive indices satisfying the following relationship 1A or 1B.

$$n_x > n_y = n_z \quad \text{Relationship Equation 1A}$$

$$n_x < n_y = n_z \quad \text{Relationship Equation 1B}$$

In the Relationship Equation 1A and 1B, $n_x$ denotes a refractive index of the first or second phase delay layer at a slow axis thereof, $n_y$ denotes a refractive index of the first or second phase delay layer at a fast axis thereof, and $n_z$ denotes a refractive index of the first or second phase delay layer in a direction perpendicular to the fast and slow axes thereof.

As an example, the first phase delay layer 120a and the second phase delay layer 120b may have refractive indices satisfying the relationship 1A, respectively.

As an example, the first phase delay layer 120a and the second phase delay layer 120b may have refractive indices satisfying the relationship 1B, respectively.

As an example, the first phase delay layer 120a may have refractive indices satisfying the relationship 1A and the second phase delay layer 120b may have refractive indices satisfying the relationship 1B.

As an example, the first phase delay layer 120a may have refractive indices satisfying the relationship 1B and the second phase delay layer 120b may have refractive indices satisfying the relationship 1A.

The first phase delay layer 120a and the second phase delay layer 120b may independently be less than or equal to about 5 μm.

In an exemplary embodiment, the first phase delay layer 120a and the second phase delay layer 120b may contact directly each other. In an alternative exemplary embodiment, an adhesion layer (not shown) may be disposed therebetween. In such an embodiment, the adhesion layer may include, for example, a pressure sensitive adhesive.

In an exemplary embodiment, the first phase delay layer 120a and the second phase delay layer 120b may be formed by applying a liquid crystal solution on a substrate. In such an embodiment, the first phase delay layer 120a and the second phase delay layer 120b may be formed on respective substrates or be sequentially formed on a same substrate. The substrate may be, for example, a TAC film, but is not limited thereto. The solution may include a liquid crystal and a solvent such as toluene, xylene, cyclohexanone, and the like, and the solution may be, for example, applied on the transparent substrate with a solution process such as spin coating. Subsequently, the solution may be further dried, and for example, cured with ultraviolet ("UV") rays.

The phase delay layer 120 may accomplish the reverse wavelength dispersion delay by assembling the first phase delay layer 120a and the second phase delay layer 120b having predetermined optical properties, and may provide λ/4 retardation in the entire visible ray region. Accordingly, the phase delay layer 120 may effectively accomplish the circularly polarized compensation function, and the display characteristics of the display device including an optical film including the polarization film 110 may be improved.

Such an embodiment of the optical film 100 may be applied to various display devices.

In an exemplary embodiment, a display device includes a display panel and an optical film positioned on a surface of the display panel. The display panel may be a liquid crystal panel or organic light emitting diode panel, but is not limited thereto.

Hereinafter, an exemplary embodiment of a display device, where the display device is an organic light emitting display, will be described in detail.

Figure 5:
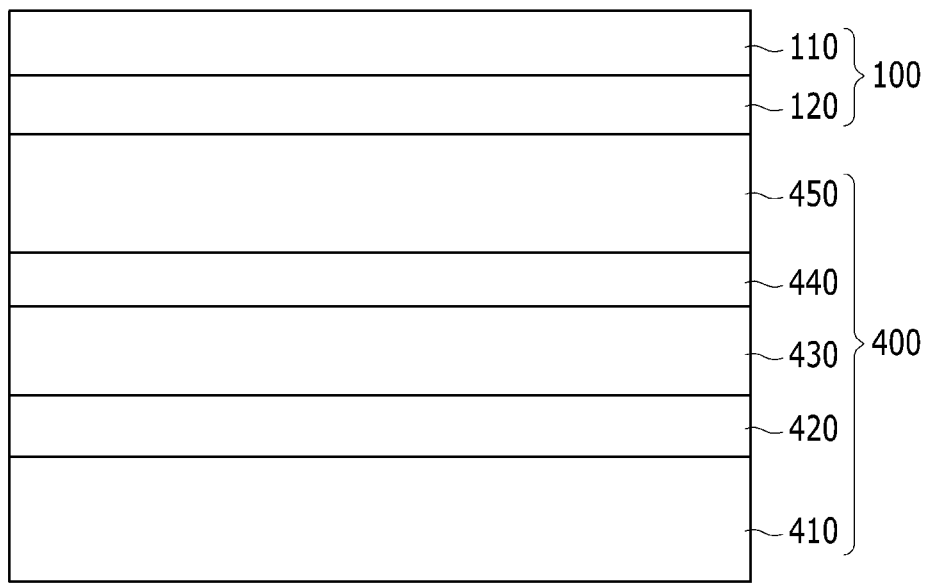
FIG. 5 is a schematic cross-sectional view of an exemplary embodiment of an organic light emitting display according to the invention.

FIG. 5 is a cross-sectional view showing an exemplary embodiment of an organic light emitting display according to the invention.

Referring to FIG. 5, an exemplary embodiment of the organic light emitting display according to the invention includes an organic light emitting diode panel 400 and an optical film 100 disposed on a surface (e.g., an upper surface or a front surface) of the organic light emitting diode panel 400.

The organic light emitting diode panel 400 may include a base substrate 410, a lower electrode 420, an organic emission layer 430, an upper electrode 440, and an encapsulation substrate 450.

The base substrate 410 may include or be made of glass or plastic.

At least one of the lower electrode 420 and the upper electrode 440 may be an anode, and the other one may be a cathode. The anode is an electrode injected with holes, and may include or be made of a transparent conductive material having a high work function to transmit the emitted light to the outside, for example, indium tin oxide ("ITO") or indium zinc oxide ("IZO"). The cathode is an electrode injected with electrons, and may include be made of a conductive material having a low work function and not affecting the organic material, for example, aluminum (Al), calcium (Ca), barium (Ba) or a combination thereof.

The organic emission layer 430 includes an organic material which may emit light when a voltage is applied to the lower electrode 420 and the upper electrode 440.

In such an embodiment, an auxiliary layer (not shown) may be further provided between the lower electrode 420 and the organic emission layer 430 and between the upper electrode 440 and the organic emission layer 430. The auxiliary layer balances electrons and holes, and may include a hole transport layer, a hole injection layer ("HIL"), an electron injection layer ("EIL"), and an electron transporting layer.

The encapsulation substrate 450 may include or be made of glass, metal or a polymer, and may seal the lower electrode 420, the organic emission layer 430 and the upper electrode 440, to effectively prevent moisture and/or oxygen inflow from the outside.

The optical film 100 may be disposed on a light-emitting side of the organic light emitting diode panel 400. In an exemplary embodiment of the organic light emitting display having a bottom emission structure, in which light is emitted at a side of the base substrate 410, the optical film 100 may be disposed on an exterior side of the base substrate 410. In an exemplary embodiment of the organic light emitting display having a top emission structure, in which light is emitted at a side of the encapsulation substrate 450, the optical film 100 may be disposed on an exterior side of the encapsulation substrate 450.

The optical film 100 includes the polarization film 110 and the phase delay layer 120. In such an embodiment, as described above, the polarization film 110 may be self-integrated and formed of a melt blend of a polymer resin and a dichroic dye, and the phase delay layer 120 may be a single-layered or multi-layered (e.g., two-layered) liquid crystal anisotropic layer, as described above. The polarization film 110 and the phase delay layer 120 are substantially the same as those described above, and may effectively prevent a display device from having visibility deterioration caused by light inflowing from the outside after passing the polarization film 110 and being reflected by a metal, such as an electrode and the like, in the organic light emitting diode panel 400. Accordingly, display characteristics of the organic light emitting display including such an optical film may be substantially improved.

Hereinafter, a liquid crystal display ("LCD") is described as one example of the display device.

Figure 6:
FIG. 6 is a schematic cross-sectional view of a liquid crystal display ("LCD") device according to the invention.

FIG. 6 is a cross-sectional view schematically showing an exemplary embodiment of an LCD according to the invention.

Referring to FIG. 6, an exemplary embodiment of the LCD according to the invention includes a liquid crystal panel 500, and an optical film 100 disposed on the liquid crystal panel 500. In one exemplary embodiment, for example, the optical film 100 may be disposed on an upper or lower surface of the liquid crystal panel 500.

The liquid crystal panel 500 may be a twist nematic ("TN") mode panel, a vertical alignment ("PVA") mode panel, an in-plane switching ("IPS") mode panel or an optically compensated bend ("OCB") mode panel, for example.

In an exemplary embodiment, as shown in FIG. 6, the liquid crystal panel 500 may include a first display panel 510, a second display panel 520, and a liquid crystal layer 530 interposed between the first display panel 510 and the second display panel 520.

In an exemplary embodiment, the first display panel 510 may include, for example, a thin film transistor (not shown) disposed on a substrate (not shown) and a first electric field generating electrode (not shown) connected to the thin film transistor, and the second display panel 520 may include, for example, a color filter (not shown) disposed on a substrate (not shown) and a second electric field generating electrode (not shown), but not being limited thereto. In an alternative exemplary embodiment, the color filter may be included in the first display panel 510, and the first electric field generating electrode and the second electric field generating electrode may be disposed on the first display panel 510.

The liquid crystal layer 530 may include a plurality of liquid crystal molecules. The liquid crystal molecules may have positive or negative dielectric anisotropy. In an exemplary embodiment, where the liquid crystal molecules having positive dielectric anisotropy, the major (e.g., longitudinal) axes thereof may be aligned substantially parallel to the surface of the first display panel 510 and the second display panel 520 when an electric field is not applied thereto, and the major axes may be aligned substantially perpendicular to the surface of the first display panel 510 and second display panel 520 when an electric field is applied thereto. In an exemplary embodiment, where the liquid crystal molecules having negative dielectric anisotropy, the major axes may be aligned substantially perpendicular to the surface of the first display panel 510 and the second display panel 520 when an electric field is not applied thereto, and the major axes may be aligned substantially parallel to the surface of the first display panel 510 and the second display panel 520 when an electric field is applied thereto.

In an exemplary embodiment, the optical film 100 may be disposed on the outside (e.g., an external surface) of the liquid crystal panel 500. In an exemplary embodiment, as shown in FIG. 6, the optical film 100 may be disposed on both opposing surfaces (e.g., lower and upper surfaces) of the liquid crystal panel 500, but not being limited thereto. In an alternative exemplary embodiment, the optical film 100 may be disposed on only one of the lower and upper surfaces of the liquid crystal panel 500.

The optical film 100 include the polarization film 110, which may be self-integrated and formed of a melt blend of a polymer resin and a dichroic dye, and the phase delay layer 120, which is a one- or two-layered liquid crystal anisotropic layer as described above. In such an embodiment, the optical film 100 is substantially the same as the optical film described above, and any repetitive detailed description thereof will be omitted.

Hereinafter, the disclosure will be described in greater detail with reference to examples. However, these examples are described for exemplary purposes only, and the invention is not limited thereto or thereby.

Manufacture of Polarization Film or Polarizing Plate

Preparation Example 1

A composition for a polarization film is prepared by mixing a polymer resin including PP and a PP-PE in a weight ratio of 5:5 (w/w), and each dichroic dye represented by the following Chemical Formulae A, B and C in amounts of 0.5, 0.2 and 0.3 parts by weight, respectively, based on 100 parts by weight of the polymer resin.

Chemical Formula A

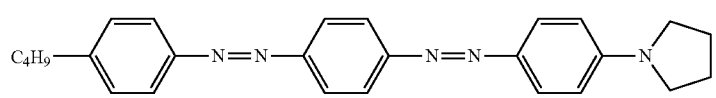

Chemical Formula B

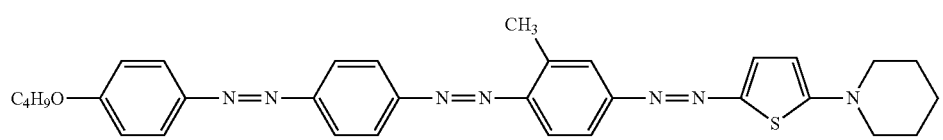

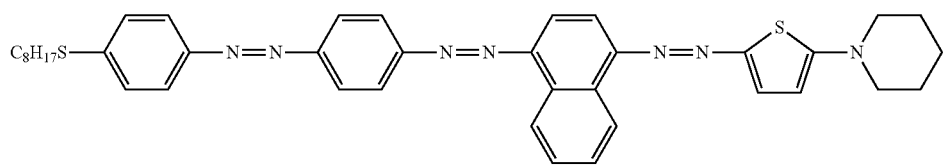

Chemical Formula C

The composition for a polarization film is melt-mixed at 250° C. using a Micro-compounder made by DSM. The melt blend is put in a sheet-shaped mold and pressed with a high pressure at a high temperature, thereby manufacturing a film. Subsequently, the film is 1000% elongated in a uniaxial direction at 115° C. (using a tensile tester made by Instron), thereby manufacturing a 20 μm-thick polarization film.

Comparative Preparation Example 1

A polyvinyl alcohol ("PVA") film (PS 60, Kuraray) is elongated, thereby manufacturing a 30 μm-thick PVA film. Subsequently, a 40 μm-thick TAC film (Fuji Film Corp.) is respectively attached on both sides of the elongated PVA film, thereby manufacturing a polarizing plate.

Preparation of Phase Delay Layer

Preparation Example 2

A 60 μm-thick Z-TAC film (Fuji Film Corp.) is rubbed to be aligned in one direction, coated with biaxial liquid crystals ($n_x \neq n_y \neq n_z$, RMS03-013C, Merck & Co., Inc.), and dried in a drying oven at 60° C. for 1 minute to remove a coating solvent. Subsequently, the coated liquid crystals are photo-cross-linked by UV rays at 80 milliwatts per square centimeter (mW/cm$^2$) for 30 seconds in a container filled with nitrogen, forming a λ/4 phase delay layer having optical properties as in the following Table 1. Then, in-plane phase retardation, thickness direction retardation, and wavelength dispersion of the λ/4 phase delay layer are measured by using Axoscan equipment (Axometrics Inc.).

TABLE 1

| | In-phase retardation | Wavelength dispersion | | Thickness direction | |
|---|---|---|---|---|---|
| | ($R_e$) $R_e$ (550 nm) | $R_e$ (450 nm)/ $R_e$ (550 nm) | $R_e$ (650 nm)/ $R_e$ (550 nm) | retardation ($R_{th}$) | Thickness (μm) |
| λ/4 | 143 | 0.91 | 1.01 | 106 | 4 |

Preparation Example 3

A 60 μm-thick Z-TAC film (Fuji Film Corp.) is rubbed to be aligned in one direction, coated with +A plate liquid crystals ($n_x > n_y = n_z$, RMM141C, Merck & Co., Inc.), and dried in an oven at 60° C. for 1 minute to remove a coating solvent. Subsequently, the coated liquid crystals are photo-cross-linked by radiating UV rays at 80 mW/cm$^2$ for 30 seconds in a container filled with nitrogen, forming a λ/2 phase delay layer having optical properties as in the following Table 2. Subsequently, a 60 μm-thick Z-TAC film (Fuji Film Corp.) is rubbed and orientation-treated in one direction, coated with +A plate liquid crystals ($n_x > n_y = n_z$, RMM141C, Merck & Co., Inc.), and then dried in an oven at 60° C. for 1 minutes to remove a coating solvent. Subsequently, the coated crystal are photo-cross-linked by radiating UV rays at 80 mW/cm$^2$ for 30 seconds in a container filled with nitrogen, forming a λ/4 phase delay layer having optical properties as in the following Table 2.

TABLE 2

| | In-phase retardation | Wavelength dispersion | | Thickness direction | |
|---|---|---|---|---|---|
| | ($R_e$) $R_e$ (550 nm) | $R_e$ (450 nm)/ $R_e$ (550 nm) | $R_e$ (650 nm)/ $R_e$ (550 nm) | retardation ($R_{th}$) | Thickness (μm) |
| λ/2 | 249 | 1.12 | 0.95 | 116 | 2 |
| λ/4 | 122 | 1.12 | 0.95 | 56 | 1 |
| λ/2 + λ/4 | 140 | 0.77 | 1.09 | 172 | 3 |

Preparation Example 4

A 60 μm-thick Z-TAC film (Fuji Film Corp.) is rubbed to be aligned in one direction, coated with +A plate liquid crystals ($n_x > n_y = n_z$, RMM141C, Merck & Co., Inc.), and dried in an oven at 60° C. for 1 minute to remove a coating solvent. Subsequently, the coated liquid crystals are photo-cross-linked by radiating UV rays at 80 mW/cm$^2$ for 30 seconds in a container filled with nitrogen, forming a λ/2 phase delay layer having optical properties as in the following Table 3. Subsequently, a 60 μm-thick Z-TAC film (Fuji Film Corp.) is rubbed and orientation-treated in one direction, coated with +A plate liquid crystals ($n_x > n_y = n_z$, RMM141C, Merck & Co., Inc.), and then dried in an oven at 60° C. for 1 minutes to remove a coating solvent. Subsequently, the coated crystal are photo-cross-linked by radiating UV rays at 80 mW/cm$^2$ for 30 seconds in a container filled with nitrogen, forming a λ/4 phase delay layer having optical properties as in the following Table 3.

TABLE 3

| | In-phase retardation | Wavelength dispersion | | Thickness direction | |
|---|---|---|---|---|---|
| | ($R_e$) $R_e$ (550 nm) | $R_e$ (450 nm)/ $R_e$ (550 nm) | $R_e$ (650 nm)/ $R_e$ (550 nm) | retardation ($R_{th}$) | Thickness (μm) |
| λ/2 | 240 | 1.12 | 0.95 | 110 | 2 |
| λ/4 | 120 | 1.12 | 0.97 | 57 | 1 |
| λ/2 + λ/4 | 134 | 0.78 | 1.06 | 167 | 3 |

Preparation Example 5

A 60 μm-thick Z-TAC film (Fuji Film Corp.) is rubbed to be aligned in one direction, coated with −A plate liquid crystals ($n_x < n_y = n_z$, discotic liquid crystal), and dried in an oven at 60° C. for 1 minute to remove a coating solvent. Subsequently, the coated liquid crystals are photo-cross-linked by radiating UV rays at 80 mW/cm² for 30 seconds in a container filled with nitrogen, forming a λ/2 phase delay layer having optical properties as in the following Table 4. Subsequently, a 60 μm-thick Z-TAC film (Fuji Film Corp.) is rubbed and orientation-treated in one direction, coated with −A plate liquid crystals ($n_x<n_y=n_z$, discotic liquid crystal), and then dried in an oven at 60° C. for 1 minutes to remove a coating solvent. Subsequently, the coated crystal are photo-cross-linked by radiating UV rays at 80 mW/cm² for 30 seconds in a container filled with nitrogen, forming a λ/4 phase delay layer having optical properties as in the following Table 4.

TABLE 4

| | In-phase retardation ($R_e$) $R_e$ (550 nm) | Wavelength dispersion | | Thickness direction | Thickness (μm) |
|---|---|---|---|---|---|
| | | $R_e$ (450 nm)/ $R_e$ (550 nm) | $R_e$ (650 nm)/ $R_e$ (550 nm) | retardation ($R_{th}$) | |
| λ/2 | 240 | 1.09 | 0.96 | −105 | 2 |
| λ/4 | 120 | 1.08 | 0.96 | −56 | 1 |
| λ/2 + λ/4 | 141 | 0.78 | 1.10 | −161 | 3 |

Preparation Example 6

A 60 μm-thick Z-TAC film (Fuji Film Corp.) is rubbed to be aligned in one direction, coated with −A plate liquid crystals ($n_x<n_y=n_z$, discotic liquid crystal), and dried in an oven at 60° C. for 1 minute to remove a coating solvent. Subsequently, the coated liquid crystals are photo-cross-linked by radiating UV rays at 80 mW/cm² for 30 seconds in a container filled with nitrogen, forming a λ/2 phase delay layer having optical properties as in the following Table 5. Subsequently, a 60 μm-thick Z-TAC film (Fuji Film Corp.) is rubbed and orientation-treated in one direction, coated with +A plate liquid crystals ($n_x>n_y=n_z$, RMM141C, Merck & Co., Inc.), and then dried in an oven at 60° C. for 1 minutes to remove a coating solvent. Subsequently, the coated crystal are photo-cross-linked by radiating UV rays at 80 mW/cm² for 30 seconds in a container filled with nitrogen, forming a λ/4 phase delay layer having optical properties as in the following Table 5.

TABLE 5

| | In-phase retardation ($R_e$) $R_e$ (550 nm) | Wavelength dispersion | | Thickness direction | Thickness (μm) |
|---|---|---|---|---|---|
| | | $R_e$ (450 nm)/ $R_e$ (550 nm) | $R_e$ (650 nm)/ $R_e$ (550 nm) | retardation ($R_{th}$) | |
| λ/2 | 240 | 1.09 | 0.96 | −105 | 2 |
| λ/4 | 120 | 1.12 | 0.97 | 57 | 1 |
| λ/2 + λ/4 | 138 | 0.84 | 1.08 | −48 | 3 |

Preparation Example 7

A 60 μm-thick Z-TAC film (Fuji Film Corp.) is rubbed to be aligned in one direction, coated with +A plate liquid crystals ($n_x>n_y=n_z$, RMM141C, Merck & Co., Inc.), and dried in an oven at 60° C. for 1 minute to remove a coating solvent. Subsequently, the coated liquid crystals are photo-cross-linked by radiating UV rays at 80 mW/cm² for 30 seconds in a container filled with nitrogen, forming a λ/2 phase delay layer having optical properties as in the following Table 6. Subsequently, a 60 μm-thick Z-TAC film (Fuji Film Corp.) is rubbed and orientation-treated in one direction, coated with −A plate liquid crystals ($n_x<n_y=n_z$, discotic liquid crystal), and then dried in an oven at 60° C. for 1 minutes to remove a coating solvent. Subsequently, the coated crystal are photo-cross-linked by radiating UV rays at 80 mW/cm² for 30 seconds in a container filled with nitrogen, forming a λ/4 phase delay layer having optical properties as in the following Table 6.

TABLE 6

| | In-phase retardation ($R_e$) $R_e$ (550 nm) | Wavelength dispersion | | Thickness direction | Thickness (μm) |
|---|---|---|---|---|---|
| | | $R_e$ (450 nm)/ $R_e$ (550 nm) | $R_e$ (650 nm)/ $R_e$ (550 nm) | retardation ($R_{th}$) | |
| λ/2 | 240 | 1.12 | 0.95 | 110 | 2 |
| λ/4 | 120 | 1.08 | 0.96 | −56 | 1 |
| λ/2 + λ/4 | 136 | 0.80 | 1.08 | 54 | 3 |

Manufacture of Optical Film

Example 1

An adhesive (PS-47, Soken Chemical & Engineering Co., Ltd.) is coated on a surface of the polarization film according to Preparation Example 1, and the polarization film is disposed to face the phase delay layer according to Preparation Example 2. Subsequently, the phase delay layer is transferred on the adhesive, while the Z-TAC film is removed, manufacturing an optical film. The polarization film has an optical axis of 0°, the phase delay layer has a slow axis of 45°, and the optical film is about 34 μm thick.

Example 2

An adhesive (PS-47, Soken Chemical & Engineering Co., Ltd.) is coated on a surface of the polarization film according to Preparation Example 1, and then the polarization film is disposed to face the λ/2 phase delay layer according to Preparation Example 3. The λ/2 phase delay layer is transferred on the adhesive, while the Z-TAC film is removed. Subsequently, an adhesive (PS-47, Soken Chemical & Engineering Co., Ltd.) is coated on a surface of the λ/2 phase delay layer. The λ/4 phase delay layer according to Preparation Example 3 is disposed on the adhesive to face the λ/2 phase delay layer, and then the λ/4 phase delay layer is transferred, while the Z-TAC film is removed, manufacturing an optical film. The polarization film has an optical axis of 0°, the λ/2 phase delay layer has a slow axis of 15°, the λ/4 phase delay layer has a slow axis of 75°, and the optical film is about 38 μm thick.

Example 3

An adhesive (PS-47, Soken Chemical & Engineering Co., Ltd.) is coated on a surface of the polarization film according to Preparation Example 1, and then the polarization film is disposed to face the λ/2 phase delay layer according to Preparation Example 4. The λ/2 phase delay layer is transferred on the adhesive, while the Z-TAC film is removed. Subsequently, an adhesive (PS-47, Soken Chemical & Engineering Co., Ltd.) is coated on a surface of the λ/2 phase delay layer. The λ/4 phase delay layer according to Preparation Example 3 is disposed on the adhesive to face the λ/2 phase delay layer, and then the λ/4 phase delay layer is transferred, while the Z-TAC film is removed, manufacturing an optical film. The polarization film has an optical axis of 0°, the λ/2 phase delay layer has a slow axis of 15°, the λ/4 phase delay layer has a slow axis of 75°, and the optical film is about 38 μm thick.

Example 4

An adhesive (PS-47, Soken Chemical & Engineering Co., Ltd.) is coated on a surface of the polarization film according to Preparation Example 1, and then the polarization film is disposed to face the λ/2 phase delay layer according to Preparation Example 5. The λ/2 phase delay layer is transferred on the adhesive, while the Z-TAC film is removed. Subsequently, an adhesive (PS-47, Soken Chemical & Engineering Co., Ltd.) is coated on a surface of the λ/2 phase delay layer. The λ/4 phase delay layer according to Preparation Example 3 is disposed on the adhesive to face the λ/2 phase delay layer, and then the λ/4 phase delay layer is transferred, while the Z-TAC film is removed, manufacturing an optical film. The polarization film has an optical axis of 0°, the λ/2 phase delay layer has a slow axis of 15°, the λ/4 phase delay layer has a slow axis of 75°, and the optical film is about 38 μm thick.

Example 5

An adhesive (PS-47, Soken Chemical & Engineering Co., Ltd.) is coated on a surface of the polarization film according to Preparation Example 1, and then the polarization film is disposed to face the λ/2 phase delay layer according to Preparation Example 6. The λ/2 phase delay layer is transferred on the adhesive, while the Z-TAC film is removed. Subsequently, an adhesive (PS-47, Soken Chemical & Engineering Co., Ltd.) is coated on a surface of the λ/2 phase delay layer. The λ/4 phase delay layer according to Preparation Example 3 is disposed on the adhesive to face the λ/2 phase delay layer, and then the λ/4 phase delay layer is transferred, while the Z-TAC film is removed, manufacturing an optical film. The polarization film has an optical axis of 0°, the λ/2 phase delay layer has a slow axis of 15°, the λ/4 phase delay layer has a slow axis of 75°, and the optical film is about 38 μm thick.

Example 6

An adhesive (PS-47, Soken Chemical & Engineering Co., Ltd.) is coated on a surface of the polarization film according to Preparation Example 1, and then the polarization film is disposed to face the λ/2 phase delay layer according to Preparation Example 7. The λ/2 phase delay layer is transferred on the adhesive, while the Z-TAC film is removed. Subsequently, an adhesive (PS-47, Soken Chemical & Engineering Co., Ltd.) is coated on a surface of the λ/2 phase delay layer. The λ/4 phase delay layer according to Preparation Example 3 is disposed on the adhesive to face the λ/2 phase delay layer, and then the λ/4 phase delay layer is transferred, while the Z-TAC film is removed, manufacturing an optical film. The polarization film has an optical axis of 0°, the λ/2 phase delay layer has a slow axis of 15°, the λ/4 phase delay layer has a slow axis of 75°, and the optical film is about 38 μm thick.

Comparative Example 1

An adhesive (PS-47, Soken Chemical & Engineering Co., Ltd.) is coated on a surface of the polarization film according to Comparative Preparation Example 1, and the polarization film is disposed to face the λ/2 phase delay layer according to Preparation Example 1. The λ/2 phase delay layer is transferred, while the Z-TAC film on the adhesive is removed. Subsequently, an adhesive (PS-47, Soken Chemical & Engineering Co., Ltd.) is coated on a surface of the λ/2 phase delay layer. The λ/4 phase delay layer according to Preparation Example 3 is disposed on the adhesive to face the λ/2 phase delay layer, and then transferred thereon, while the Z-TAC film is removed, manufacturing an optical film. The polarization film has an optical axis of 0°, the λ/2 phase delay layer has a slow axis of 15°, the λ/4 phase delay layer has a slow axis of 75°, and the optical film is about 115 μm thick.

Comparative Example 2

A λ/4 phase delay layer having a 50 μm-thick inverse wavelength dispersion and optical properties as in the following Table 7 (WRS, Teijin Ltd.) is prepared.

Then, an optical film is manufactured by coating an adhesive (PS-47, Soken Chemical & Engineering Co., Ltd.) on a surface of the polarization film according to Preparation Example 1, and uniting the λ/4 phase delay layer with the polarization film. The polarizing plate has an optical axis of 0°, the λ/4 phase delay layer has a slow axis of 45°, and the optical film is about 80 μm thick.

TABLE 7

| | In-phase retardation | Wavelength dispersion | | Thickness direction | |
|---|---|---|---|---|---|
| | ($R_e$) $R_e$ (550 nm) | $R_e$ (450 nm)/ $R_e$ (550 nm) | $R_e$ (650 nm)/ $R_e$ (550 nm) | retardation ($R_{th}$) | Thickness (μm) |
| λ/4 | 146 | 0.89 | 1.03 | 73 | 50 |

Manufacture of Organic Light Emitting Display

Example 7

An organic light emitting display is manufactured by attaching the optical film according to Example 1 on an organic light emitting diode panel (Galaxy S4 panel, Samsung Display).

Example 8

An organic light emitting display is manufactured by attaching the optical film according to Example 2 on an organic light emitting diode panel (Galaxy S4 panel, Samsung Display).

Example 9

An organic light emitting display is manufactured by attaching the optical film according to Example 3 on an organic light emitting diode panel (Galaxy S4 panel, Samsung Display).

Example 10

An organic light emitting display is manufactured by attaching the optical film according to Example 4 on an organic light emitting diode panel (Galaxy S4 panel, Samsung Display).

Example 11

An organic light emitting display is manufactured by attaching the optical film according to Example 5 on an organic light emitting diode panel (Galaxy S4 panel, Samsung Display).

Example 12

An organic light emitting display is manufactured by attaching the optical film according to Example 6 on an organic light emitting diode panel (Galaxy S4 panel, Samsung Display).

Comparative Example 3

An organic light emitting display is manufactured by attaching the optical film according to Comparative Example 1 on an organic light emitting diode panel (Galaxy S4 panel, Samsung Display).

Comparative Example 4

An organic light emitting display is manufactured by attaching the optical film according to Comparative Example 2 on an organic light emitting diode panel (Galaxy S4 panel, Samsung Display).

Evaluation 1

Reflectance at front of the organic light emitting displays according to Examples 7 and 8 and Comparative Examples 3 and 4 is evaluated.

The reflectance at front is evaluated with a spectrum colorimeter (CM-3600d, Konica Minolta Inc.) by supplying light with a D65 light source under reflection of 8° and light-receiving of 2°.

The results are shown in Table 8.

TABLE 8

|  | Example 7 | Example 8 | Comparative Example 3 | Comparative Example 4 |
|---|---|---|---|---|
| Reflectance (%) | 5.2 | 5.1 | 5.0 | 5.2 |

Referring to Table 8, the organic light emitting displays according to Examples 7 and 8 showed equivalent reflectance at front to that of the organic light emitting displays according to Comparative Examples 3 and 4. Accordingly, the organic light emitting displays according to Examples 7 and 8 have a thin film shape but no influence on display characteristics by remarkably decreasing thickness of an optical film while showing equivalent reflectance at front.

Evaluation 2

Reflectance and reflective color at front of the organic light emitting displays according to Examples 8 to 12 and Comparative Example 4 are evaluated.

The reflectance and the reflective color at front are evaluated with a spectrum colorimeter (DMS, Display Measurement Systems, Instrument Systems) by supplying light with a D65 light source under reflection of 8°.

The reflective color may be represented using CIE-Lab color coordinates. The positive value a* denotes red, the negative value a* denotes green, the positive value b* denotes yellow, and the negative value b* denotes blue. In the CIE-Lab color coordinates, the larger the absolute values of a* and b* are, the stronger the colors corresponding thereto are.

The results are shown in Table 9.

TABLE 9

|  | Front reflectance(%) | a* | b* | Δ a*b* |
|---|---|---|---|---|
| Example 8 | 0.7 | −0.9 | −6.2 | 6.3 |
| Example 9 | 0.7 | −0.4 | −4.2 | 4.3 |
| Example 10 | 0.6 | −1.3 | −5.1 | 5.3 |
| Example 11 | 0.6 | 0.7 | −5.1 | 5.2 |
| Example 12 | 0.6 | 0.1 | −4.1 | 4.1 |
| Comparative Example 4 | 0.7 | −1.4 | −9.0 | 9.1 |

$\Delta a^*b^* = \sqrt{a^{*2}+b^{*2}}$

Referring to Table 9, the organic light emitting displays according to Examples 8 to 12 showed equivalent or improved reflectance at front and smaller reflective color values at front than that of the organic light emitting displays according to Comparative Example 4. The smaller reflective color value means that a color sense by reflection may be closer to black and a change of a color sense may be small and a visibility by reflection due to an external light may be improved. For example, the organic light emitting displays according to Examples 8 to 12 may have reflective color values at front satisfying $0 \leq \Delta a^*b^* \leq 9$.

Accordingly, the organic light emitting displays according to Examples 8 to 12 have a thin film shape but improved display characteristics by remarkably decreasing thickness of an optical film while showing equivalent or improved reflectance and improved reflective color at front.

Evaluation 3

Reflectance and reflective color at side of the organic light emitting displays according to Examples 8 to 12 and Comparative Example 4 are evaluated.

The reflectance and the reflective color at side are evaluated with a spectrum colorimeter (DMS, Display Measurement Systems, Instrument Systems) by supplying light with a D65 light source under reflection of 45°.

The results are shown in Table 10.

TABLE 10

|  | Side reflectance(%) | a* | b* | Δ a*b* |
|---|---|---|---|---|
| Example 8 | 1.3 | −3.2 | −0.5 | 3.3 |
| Example 9 | 1.3 | −3.5 | 0.9 | 4.0 |
| Example 10 | 0.8 | −1.2 | −3.2 | 3.6 |
| Example 11 | 1.0 | −1.1 | −1.4 | 2.0 |
| Example 12 | 0.8 | −0.6 | −0.9 | 1.5 |
| Comparative Example 4 | 1.2 | −3.3 | −3.3 | 5.5 |

$\Delta a^*b^* = \sqrt{a^{*2}+b^{*2}}$

Referring to Table 10, the organic light emitting displays according to Examples 8 to 12 showed equivalent or improved reflectance at side and smaller reflective color values at side than that of the organic light emitting displays according to Comparative Example 4. For example, the organic light emitting displays according to Examples 8 to 12 may have reflective color values at side satisfying $0 \leq \Delta a^*b^* \leq 5$.

Further, it is confirmed that the organic light emitting displays according to Examples 8 to 12 showed a color sense closer to black than that of the organic light emitting displays according to Comparative Example 4.

Accordingly, the organic light emitting displays according to Examples 8 to 12 have a thin film shape but improved display characteristics by remarkably decreasing thickness of an optical film while showing equivalent or improved reflectance and improved reflective color at side.

Evaluation 4

Optical durability of the organic light emitting displays according to Example 8 and Comparative Example 3 is evaluated.

The optical durability evaluation includes a thermal stability evaluation and a high temperature/high humidity evaluation, and herein, the thermal stability evaluation is performed by allowing the organic light emitting displays according to Example 8 and Comparative Example 3 to stand at 85° C. for 500 hours and measuring their light transmittance and variations of their degrees of polarization, and the high temperature/high humidity evaluation is performed by allowing the organic light emitting displays according to Example 8 and Comparative Example 3 to stand at 60° C. under humidity of 95% for 500 hours and measuring their light transmittance and variations of their degrees of polarization.

The results are shown in Table 11.

TABLE 11

| | Evaluation of thermal stability at 85° C. and 500 h | | Evaluation at high temperature and high humidity (60° C., 95%, 500 h) | |
|---|---|---|---|---|
| | Variations of light transmittance (%) | Variations of degree of polarization (%) | Variations of light transmittance (%) | Variations of degree of polarization (%) |
| Example 8 | 0.36 | 0.37 | 0.42 | 0.09 |
| Comparative Example 3 | 0.9 | 3 | 6 | 20 |

Referring to Table 11, the organic light emitting display according to Example 8 shows excellent thermal stability and excellent optical durability in a high temperature/high humidity environment.

While the invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. An optical film comprising:
 a polarization film comprising a polymer resin and a dichroic dye; and
 a phase delay layer disposed on the polarization film,
 wherein the phase delay layer comprises a first phase delay layer and a second phase delay layer,
 the first and second phase delay layers have different retardation from each other,
 each of the first and second phase delay layers comprises liquid crystal,
 an angle between a slow axis of the first phase delay layer and a slow axis of the second phase delay layer is in a range from about 50 degrees to about 70 degrees,
 in-plane phase retardation ($R_{e1}$) of the first phase delay layer for 550 nm wavelength is in a range from about 230 nm to about 270 nm,
 in-plane phase retardation ($R_{e2}$) of the second phase delay layer for 550 nm wavelength is in a range from about 100 nm to about 140 nm,
 entire in-plane phase retardation ($R_{e0}$) of the first phase delay layer and the second phase delay layer for 550 nm wavelength is in a range from about 120 nm to about 160 nm,
 each of the first phase delay layer and the second phase delay layer has a refractive index satisfying the following relationship: nx>ny=nz or nx<ny=nz,
 wherein
 each of the first phase delay layer and the second phase delay layer has a refractive index satisfying the following relationship: nx<ny=nz, or
 one of the first phase delay layer and the second phase delay layer has refractive index satisfying the following relationship: nx>ny=nz, and the other of the first phase delay layer and the second phase delay layer has refractive index satisfying the following relationship: nx<ny=nz,
 wherein nx denotes a refractive index of the first or second phase delay layer at a slow axis thereof, ny denotes a refractive index of the first or second phase delay layer at a fast axis thereof, and nz denotes a refractive index of the first or second phase delay layer in a direction perpendicular to the fast and slow axes thereof.

2. The optical film of claim 1, wherein entire in-plane phase retardation ($R_{e0}$) of the first phase delay layer and the second phase delay layer for 450 nm, 550 nm, and 650 nm wavelengths satisfies the following inequality:
 $R_{e0}$ (450 nm)≤$R_{e0}$ (550 nm)<$R_{e0}$(650 nm) or $R_{e0}$ (450 nm)<$R_{e0}$ (550 nm)≤$R_{e0}$ (650nm).

3. The optical film of claim 2, wherein
 the first phase delay layer and the second phase delay layer have entire short wavelength dispersion in a range from about 0.70 to about 0.99, and
 the first phase delay layer and the second phase delay layer have entire long wavelength dispersion in a range from about 1.01 to about 1.20.

4. The optical film of claim 1, wherein
 the first phase delay layer is a λ/2 phase delay layer, and
 the second phase delay layer is a λ/4 phase delay layer.

5. The optical film of claim 4, wherein in-plane phase retardation ($R_{e1}$) of the first phase delay layer for 450 nm, 550 nm and 650 nm wavelengths satisfies the following inequality: $R_{e1}$ (450 nm)>$R_{e1}$ (550 nm)>$R_{e1}$ (650 nm),
 in-plane phase retardation ($R_{e2}$) of the second phase delay layer for 450 nm, 550 nm and 650 nm wavelengths satisfies the following inequality: $R_{e2}$ (450 nm)>$R_{e2}$ (550 nm)>$R_{e2}$ (650 nm), and
 entire in-plane phase retardation ($R_{e0}$) of the first phase delay layer and the second phase delay layer for 450 nm, 550 nm and 650 nm wavelengths satisfies the following inequality: $R_{e0}$ (450 nm)≤$R_{e0}$ (550 nm)<$R_{e0}$ (650 nm) or $R_{e0}$ (450 nm)<$R_{e0}$ (550 nm)≤$R_{e0}$ (650 nm).

6. The optical film of claim 5, wherein
the first phase delay layer and the second phase delay layer each has short wavelength dispersion in a range from about 1.1 to about 1.2, and
the first phase delay layer and the second phase delay layer have entire short wavelength dispersion in a range from about 0.70 to about 0.99.

7. The optical film of claim 5, wherein
the first phase delay layer and the second phase delay layer each has long wavelength dispersion in a range from about 0.9 to about 1.0, and
the first phase delay layer and the second phase delay layer have entire long wavelength dispersion in a range from about 1.01 to about 1.20.

8. The optical film of claim 4, further comprising:
an adhesion layer disposed between the first phase delay layer and the second phase delay layer.

9. The optical film of claim 1, wherein the entire thickness of the first phase delay layer and the second phase delay layer is less than or equal to about 10 μm.

10. The optical film of claim 1, further comprising:
an adhesion layer disposed between the polarization film and the phase delay layer, the phase delay layer comprising the first phase delay layer and the second phase delay layer.

11. The optical film of claim 1, wherein the polymer resin comprises a polyolefin, a polyamide, a polyester, a polyacryl, polystyrene, a copolymer thereof, or a combination thereof.

12. The optical film of claim 11, wherein the polymer resin comprises polyethylene (PE), polypropylene (PP), polyethylene terephthalate (PET), polyethylene terephthalate glycol (PETG), polyethylene naphthalate (PEN), nylon, a copolymer thereof, or a combination thereof.

13. The optical film of claim 1, wherein the polarization film has a thickness less than or equal to about 100 μm.

14. The optical film of claim 1, wherein the polarization film comprises a melt blend of the polymer resin and the dichroic dye.

15. The optical film of claim 1, wherein a transparent substrate is not present between the polarization film and the phase delay layer, the phase delay layer comprising the first phase delay layer and the second phase delay layer.

16. A display device including the optical film of claim 1.

17. A method of manufacturing an optical film, the method comprising:
melt-blending a polymer resin and a dichroic dye to prepare a polarization film;
preparing a phase delay layer comprising a liquid crystal on a substrate; and
providing the phase delay layer on the polarization film,
wherein the phase delay layer comprises a first phase delay layer and a second phase delay layer,
the first and second phase delay layers have different retardation from each other,
each of the first and second phase delay layers comprises liquid crystal,
an angle between a slow axis of the first phase delay layer and a slow axis of the second phase delay layer is in a range from about 50 degrees to about 70 degrees,
in-plane phase retardation ($R_{e1}$) of the first phase delay layer for 550 nm wavelength is in a range from about 230 nm to about 270 nm,
in-plane phase retardation ($R_{e2}$) of the second phase delay layer for 550 nm wavelength is in a range from about 100 nm to about 140 nm,
entire in-plane phase retardation ($R_{e0}$) of the first phase delay layer and the second phase delay layer for 550 nm wavelength is in a range from about 120 nm to about 160 nm,
each of the first phase delay layer and the second phase delay layer has a refractive index satisfying the following relationship: $n_x>n_y=n_z$ or $n_x<n_y=n_z$,
wherein
each of the first phase delay layer and the second phase delay layer has a refractive index satisfying the following relationship: $n_x<n_y=n_z$, or
one of the first phase delay layer and the second phase delay layer has refractive index satisfying the following relationship: $n_x>n_y=n_z$, and the other of the first phase delay layer and the second phase delay layer has refractive index satisfying the following relationship: $n_x<n_y=n_z$,
wherein $n_x$ denotes a refractive index of the first or second phase delay layer at a slow axis thereof, $n_y$ denotes a refractive index of the first or second phase delay layer at a fast axis thereof, and $n_z$ denotes a refractive index of the first or second phase delay layer in a direction perpendicular to the fast and slow axes thereof.

18. The method of claim 17, wherein the providing the phase delay layer on the polarization film comprises:
removing the phase delay layer from the substrate; and
transferring the phase delay layer to a surface of the polarization film.

19. The method of claim 17, further comprising:
providing an adhesion layer on a surface of the polarization film.

20. The method of claim 17, wherein the preparing the phase delay layer comprises stacking a λ/2 phase delay layer and a λ/4 phase delay layer on the substrate.

* * * * *